April 21, 1959 I. N. STEIGMAN 2,882,788

SOUND PICTURE APPARATUS

Filed March 15, 1955

Inventor
Israel N. Steigman
By
Harry Jacobson
Attorney 2,882,788

SOUND PICTURE APPARATUS

Israel N. Steigman, Brooklyn, N.Y.

Application March 15, 1955, Serial No. 494,414
6 Claims. (Cl. 88—16.2)

This invention relates to the means for maintaining synchronized projection of motion pictures and reproduction of sound on separate film and imperforate magnetic tape respectively.

In relatively inexpensive or amateur making and exhibiting of sound motion pictures, as in homes, clubs, meetings or the like, no serious problems of synchronization of the sound with the picture are presented even though separate picture film and sound tape are employed, when both the film and the tape are perforated and advanced by sprocket wheels which are usually found in the projector and sound reproducer. Owing however to the relatively high cost of perforated magnetic sound tape as compared to similar but imperforate tape, attempts have been made to substitute such separate imperforate tape for perforated tape to record and reproduce the sound in conjunction with the showing of picture film. However, the difficulties of maintaining synchronism of the imperforate tape and perforated film throughout a long showing have heretofore prevented imperforate tape from being successfully employed in connection with sound and picture projection.

The present invention therefore contemplates the provision of a direct, simple, efficient non-slipping and positive mechanical coupling between the intermittent mechanism of the picture projector and the take-up reel for the imperforate tape whereby said tape take-up reel becomes part of the mechanism or an extension of the mechanism of the projector and when the same reel or a similar reel of the same diameter is used for recording and reproducing, the angular velocity ratio of the wheel imparting linear movement to the film and the reel taking up the tape remains substantially fixed and constant and consequently the correlation of the film and tape parts throughout the lengths thereof remain undisturbed and in step with merely negligible lag or acceleration of either with respect to the other, each turn of the tape on its reel carrying the sound for precisely the same amount of the length of the picture film as is carried by each of the other turns on the reel, regardless of variations in the lengths of the turns with respect to each other.

The invention further contemplates the provision of simple, inexpensive and dependable means for insuring positive movement of perforated film and imperforate tape in substantially exact and constant correspondence with each other whereby variations in the operative movement of the film are automatically and instantaneously corrected to accord with the movement of the tape, the operative portion of the tape being maintained taut to insure the required tight winding thereof to avoid appreciable slippage on the take-up reel, which slippage would tend to destroy synchronism.

The invention further contemplates the provision of means for recording the sound on imperforate magnetic tape in synchronism with the taking of motion pictures on perforated film whereby the slight changes in the linear speed of the tape as it accumulates in a roll of increasing diameter on its take-up reel, is compensated for in reproduction without material change in the quality of the reproduced sound, the tape being wound tightly on its take-up reel to prevent disarrangement or displacement of the related portions of the picture film and tape, by positively driving the tape take-up reel at a speed corresponding to that of the film in both the making and exhibiting of the picture and sound, so that the angular velocity ratio of a shaft controlling the advance of the film to the shaft for the tape take-up reel is fixed under all conditions.

The various objects of the invention will be clear from the description which follows and from the drawings, in which.

Figures 1, 2, 3:
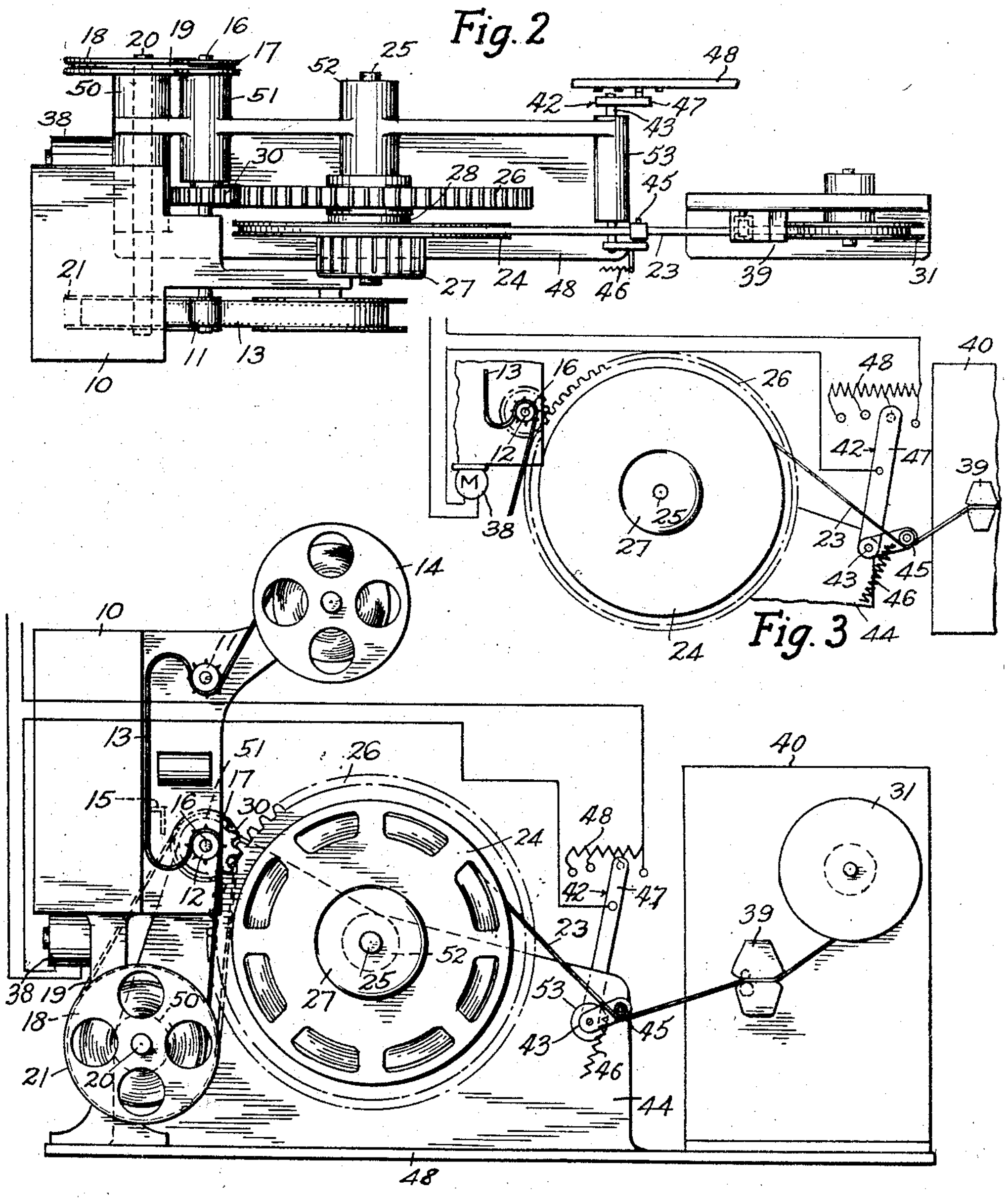
Fig. 1 is an elevational view of a projector and of sound recording and reproducing means to which the invention has been applied and wherein the picture film movement is automatically modified in accordance with variations in the tension of the imperforate sound tape advanced by an independent tape recorder to insure the correct tightness of the winding of the tape on its reel.
Fig. 2 is a top plan view thereof.

In that form of the invention shown by way of example in Figs. 1 and 2, the projector 10 is of any of the usual types, being provided with the usual sprocket wheels 11 and 12 for drawing the perforated picture film 13 off the payout reel 14 the wheel 12 being operatively connected to and controlling the intermittent mechanism. The usual intermittent mechanism of the projector is diagrammatically indicated by the numeral 15 and has the usual function. On the shaft 16 of the lower continuously rotating sprocket wheel 12 is fixed a pulley 17 which drives the pulley 18 as by means of the elastic belt 19. A suitable shaft 20 carries the pulley 18 as well as the take-up reel 21 for the picture film, though it will be understood that the reel 21 may be supported and driven in any suitable manner or as is customary in projectors.

As has been indicated, the sound tape 23 is of the magnetic type and is of the relatively inexpensive imperforate form, whereby it is not designed to be fed by sprocket wheels and hence has not been heretofore successfully employed in synchronized picture projection and accompanying sound reproduction. To attain synchronization of the picture and sound, the tape take-up reel 24 of relatively large diameter is loosely mounted on an intermediate shaft 25 carrying the gear wheel 26 also of relatively large diameter. Such large diameters aid in reducing the increase in diameter of the wound roll of tape and the consequent increase in the linear speed of the tape as the winding of the tape progresses. Such increase in speed is thereby reduced to within acceptable limits. Said reel 24 is normally fixed to the shaft 25 to rotate therewith and with the gear wheel 26 as a unit, by tightening the nut 27 which is screwed to the shaft adjacent the reel. The reel is clamped in any selected position angularly to the shaft between the nut 27 and the washer 28, said washer being arranged between the reel and the gear wheel 26. Said gear wheel is positively, as distinguished from elastically, flexibly or yieldingly, driven in any suitable manner in coordination with the intermittent mechanism of the projector.

So that there can be no appreciable slippage or relative displacement therebetween, the reel is incorporated into the projector mechanism and is in effect a positively driven extension thereof. In the form being described, a relatively small pinion 30 is fixed to the shaft 16 of the projector sprocket wheel 12, and meshes at all times with the gear wheel 26. The velocity ratio of the pinion and gear is of course constant, and other than one to one in view of the difference in the diameters of the gear and pinion, whereby operation of the projector rotates the reel shaft 25 continuously and positively at the required speed relatively to the feed of the film 13 and thereby causes coordinated rotation of the tape take-up reel 24 with the pinion when said reel has been clamped to the shaft, each turn of the tape roll on said reel carrying the sound for a definite constant and unvarying amount of the length of the picture film.

Means are provided to maintain the sound tape 23 taut or under the proper tension as it is drawn off the tape pay-out reel 31 and passes through the tape pick-up and recording head 39, which is suitably connected to an amplifier and recording device in a well known manner which need not be described nor further illustrated.

After the tautness of the tape between the head and the reel has been established, suitable starting and synchronization marks on the film and tape are brought respectively into registration with corresponding marks on the projector and the pick-up head, the nut 27 being then tightened to fix the reel to the shaft. Thereafter, operation of the motor 38 of the projector causes continuous rotation of the sprocket shaft 16 and consequent positive rotation of the pinion 30 and gear wheel 26 and of the tape take-up reel 24 in unison, the reel having thus been made an operative part of the film-advancing mechanism of the projector. The end of the tape being secured to its take-up reel, the tape is wound tightly on the reel when said reel is driven by the motor 38 through the intervening mechanism described, thereby eliminating slippage and moving a varying length of tape equal to the circumference of the turn in the roll of tape past the pick-up head for each respective consecutive equal portion of the length of the film fed by the projector.

It will be understood that the positive connection between the intermittent mechanism of the projector and the tape take-up reel allows of no slippage or relative displacement therebetween as might be the case with belt or other friction drives, and that after the tape has been tensioned, operation of the motor 38 advances corresponding lengths of the film and tape regardless of variations in the speed of the motor and just as effectively as though sprocketed means were employed to advance perforated tape or as though the sound track and picture were on the same film.

The pick-up head 39 is part of an independent tape recorder 40 of any of the usual types, the tape being advanced preferably at a uniform rate by the tape recorder in the usual manner and completely independently of the projector and of the tape take-up reel. To maintain the tape under tension, the feeler illustrated in the form of a bell-crank lever 42 pivoted at 43 to a suitable frame 44 is employed. One arm of the lever carries the roller 45 which is urged by the spring 46 into pressed contact with the tape 23, said spring urging the arm 47 of the lever toward the right hand end of the rheostat 48. Said rheostat is in the circuit to the projector motor 38 and serves to modify the speed of said motor as the arm 47 swings about its pivot on variations in the tautness of the tape which result from variations in the speed of the motor.

The change in the speed of operation of the motor 38 and the feed of the picture film follows and is dependent on the tautness of the depressed portion of the tape between the reel and the pick-up head of the tape recorder, and the tape is also wound tightly on the take-up reel therefor with negligible possibility of slippage, whereby synchronism of the picture and sound is maintained after being initially established at the beginning of the run. Should the projector motor run too fast, the reel 24 takes up more tape than is payed out by the recorder and the depressed tape length is shortened. The roller 45 of the feeler lever 42 is thereby raised against the action of the spring 46, and the arm 48 of said lever is moved in a counterclockwise direction thereby cutting in greater resistance and slowing the motor 38 until the depressed tape length is again in a state of equilibrium or remains constant in length. Similarly, if the motor 38 runs too slowly, the tape payed out by the recorder is not taken up fast enough by the reel 24, the roller 45 drops with the increase in length of the more greatly depressed portion of the tape, cutting out resistance and increasing the speed of the motor until the roller rises into its state of equilibrium.

Since the diameter of the roll of tape on the reel 24 increases as the recording or playing proceeds, it is part of my invention to use the same reel or similar reels of the same diameter for recording and for playing the sound record. When recording on separate imperforate tape, the linear speed at which the tape is wound on its reel increases slightly as the diameter of the wound roll of tape increases. The slightly increased speed, however, is not sufficient to affect adversely the quality of the recorded or reproduced sound because of the relatively large diameter of the tape take-up reel. Nor is synchronism of the sound and picture affected when the diameter of the take-up reel for the tape remains the same for recording and reproducing, for the reason that for any selected part of the length of the tape there is a corresponding part of the length of the picture film, though the length of such tape part may increase somewhat toward the end of the roll for a given part of the length of the film. Preferably, the sound record is made on the tape during a recording run of the picture film on apparatus such as above described wherein the tape take-up reel is positively driven by the projector motor through unyielding gearing. After the sound has been recorded, the film and tape are rewound and are ready for exhibition, the tape being threaded through the pick-up head under the roller 45 and then on to the same reel 24 as is used in recording or a similar reel of the same diameter, said reel being turned manually to tension the tape and to bring the synchronization marks into registry before being tightened and clamped to its shaft 25.

The frame 44 is provided with a base 48 and an upstanding web having spaced bearings 50, 51, 52 and 53 thereon for the respective shafts 20, 16, 25, and 43. The various parts other than the projector and the pick-up head and tape pay-out reel may therefore be quickly and easily interposed between the projector and said head to couple the sound to the picture without extensive changes in the projector or in the pick-up or tape recorder.

It will now be seen that I have provided a simple and efficient mechanism for utilizing imperforate sound tape to accompany motion pictures without sacrifice of synchronism especially when the same take-up reel for the tape is used for both recording and reproducing, that the mechanism employed insures positive movement of the imperforate tape and the picture film to correspond to each other though no sprocket wheel drives the tape and that the mechanism is well designed to carry out its intended purposes.

While certain specific forms of the invention have herein been shown and described, various obvious changes may be made therein without departing from the spirit of the invention defined in the appended claims.

I claim:

1. In combination, motion picture apparatus provided with mechanism including a motor for advancing motion picture film, imperforate magnetic sound tape, an independent tape recorder provided with mechanism for advancing said tape out of the recorder by paying out the tape toward a reel, a tape take-up reel secured to an end of the tape for winding the payed out tape into a roll after the tape has been advanced out of the recorder, intermeshing toothed gear wheels of different diameters forming an operative positive non-slipping and unyielding connection between the film advancing mechanism and the reel whereby operation of the film advancing mechanism causes invariable corresponding operation of the reel at a predetermined constant velocity ratio other than a one to one ratio, a free-rolling roller engaging and maintaining the intermediate otherwise free portion of the tape between the reel and the recorder in a looped position, the rotation of the reel preventing excessive elongation of the looped portion of the tape only on operation of the film advancing mechanism and corresponding rotation of the reel, and means responsive to the position of the roller for controlling the speed of operation of the film advancing mechanism and the consequent tape take-up speed of the reel, the tape being free of tape-actuating mechanism between the recorder and the reel whereby the film is advanced by the film-advancing mechanism, and the imperforate tape is taken up by the reel in synchronism with each other and with the advance of the tape by the recorder.

2. The motion picture apparatus of claim 1, the last-mentioned means comprising a rheostat responsive to the position of the roller and in a circuit to the motor.

3. The combination with a projector for motion picture film, of a tape recorder having incorporated therein means for paying out and advancing out of the recorder imperforate magnetic tape, an imperforate magnetic sound tape advanced by the recorder, a tape take-up reel of relatively large effective diameter greater than the diameter of the pinion herinafter mentioned and in spaced relation to the recorder and secured to an end of the tape to wind up in a roll tape previously advanced by the recorder, the first mentioned means and the tape take-up reel constituting the only mechanism moving as well as engaging the tape along the length thereof between said means and said reel, each turn of said roll carrying the sound for portions of equal length of the film, the tape between the recorder and the reel having a looped portion, positive non-slipping means controlled solely by the projector and independent of the recorder for driving the take-up reel in accurate invariable timed relation to the projector, said means comprising a continuously rotating pinion on the projector, a shaft for the reel, a gear on the shaft meshing with the pinion and having a diameter not less than the effective diameter of the reel and greater than that of the pinion, and means to prevent any material change in the length of the looped portion of the tape, said means including a rheostat responsive to slight changes in the length of said looped portion resulting from rotation of the reel by the projector at a speed other than the proper tape take-up speed, and means connecting the rheostat and the projector to control the speed of the projector and the pinion in accordance with the advance of the tape by the recorder and thereby to synchronize the film with the tape.

4. Sound motion picture apparatus comprising a projector for motion picture film, said projector having a motor, a first shaft continuously rotated by the motor and a pinion on the shaft, an independent tape recorder for paying out imperforate magnetic sound tape, a take-up reel for the tape operable independently of the recorder and functioning only to wind up the tape into a tight roll after the tape has been payed out and discharged from said recorder, an imperforate magnetic sound tape associated with the recorder for advance thereby toward the reel, said recorder having means therein to feed and advance the tape independently of the operation of the reel and the projector, said means and the reel constituting the only tape-moving mechanism engaging that part of the tape between the recorder and said roll of tape, the tape having an indented portion therein along the tape path between the reel and the recorder, a roller engaging said tape and constituting the sole means to maintain the indented portion in the indented shape thereof, a second shaft for the reel in spaced relation to the first shaft, a gear on the second shaft in non-slipping, positive and non-adjustable engagement with the pinion and being compelled to rotate therewith as a unit at an unalterable velocity ratio, a rheostat controlled by the roller and an electrical connection between the motor and the rheostat and controlling the speed of the motor to synchronize the film and the tape.

5. Sound motion picture apparatus comprising a projector for perforated motion picture film, said projector having an intermittent mechanism including a first shaft, a continuously rotatable pinion on the shaft, a take-up reel for winding imperforate magnetic sound tape into a tight roll having a multiplicity of turns, the turns being respectively of increasing length from the center of the roll outwardly, the reel being mounted independently of and in spaced relation to the tape recorder hereinafter mentioned, a second shaft for the reel in parallel spaced relation to the first shaft and to said tape recorder, a toothed gear fixed to said second shaft and engaging the pinion and constituting a positive non-slipping non-adjustable and unyielding connection between the pinion and the reel, means for fixing the reel to the second shaft and thereby operatively connecting the pinion and the reel together for rotation as a unit at a fixed and constant angular velocity ratio, an imperforate magnetic sound tape, an independent tape recorder having means independent of the projector and the reel for advancing the tape out of the recorder and toward the reel, the reel operating only to wind up that part of the tape advanced by and out of the recorder, and means to synchronize the film with the tape, said means being responsive to the changes in the take up of the tape by the reel to control the speed of the intermittent mechanism and of the pinion, the reel and the tape-advancing means of the recorder constituting the only mechanism both engaging and moving the tape from the recorder to the tape roll.

6. Sound motion picture apparatus comprising a picture projector having an intermittent mechanism provided with a continuously rotating pinion, an imperforate magnetic sound tape, a take-up reel for holding one end of the tape, said reel being of considerably larger effective diameter than the diameter of the pinion and thereby aiding to reduce the acceleration of the linear speed of the tape as the tape is wound on the reel, a take-up shaft on which the reel is loosely mounted, said shaft being in parallel spaced relation to the axis of the pinion, means to clamp the reel to the shaft for rotation therewith, a gear on the shaft engaging the pinion and of substantially greater diameter than that of the pinion thereby to cause continuous non-slipping and positive rotation of the reel as a unit with the pinion at a constant angular velocity ratio on operation of the intermittent mechanism, a tape recorder for imperforate tape independent of the reel and provided with means for advancing the tape toward the reel and out of the recorder, and a roller engaging a depressed portion of the tape between the reel and the recorder, the reel normally tensioning the depressed portion only when driven by said projector, and maintaining said portion taut against the roller thereby to wind the tape tightly around the reel under uniform tension, and means associated with the roller and connected to the projector and responsive to the position of the depressed portion of the tape to control the speed of rotation of the pinion and to synchronize the film with the tape.

References Cited in the file of this patent

UNITED STATES PATENTS

| | | |
|---|---|---|
| 1,716,033 | De Forest | June 4, 1929 |
| 1,845,236 | Chipman | Feb. 16, 1932 |
| 1,891,738 | Thomas | Dec. 20, 1932 |
| 2,042,027 | Simons | May 26, 1936 |
| 2,050,494 | Lindenberg | Aug. 11, 1936 |
| 2,243,112 | Morressey | May 27, 1941 |
| 2,482,672 | Kiel | Sept. 20, 1949 |

FOREIGN PATENTS

| | | |
|---|---|---|
| 505,427 | France | May 6, 1920 |
| 1,039,801 | France | May 20, 1953 |
| 514,074 | Belgium | Sept. 30, 1952 |